United States Patent

Kan et al.

Patent Number: 5,541,705
Date of Patent: Jul. 30, 1996

[54] CAMERA WITH LARGE DYNAMIC RANGE

[76] Inventors: Michael Kan, 1786 Quesada Ave., San Francisco, Calif. 94124; Kenneth C. Kitlas, 48725 Sedum Rd., Fremont, Calif. 94539

[21] Appl. No.: 180,219

[22] Filed: Jan. 12, 1994

[51] Int. Cl.⁶ ............................................. G03B 7/08
[52] U.S. Cl. ................................ 354/432; 354/227.1
[58] Field of Search .......................... 354/432, 227.1; 351/45, 49, 44, 158; 250/205, 201.1; 2/8; 348/362, 363, 364, 365, 216, 217

[56] References Cited

U.S. PATENT DOCUMENTS

| | | | |
|---|---|---|---|
| 3,555,987 | 1/1971 | Browning | 354/227.1 |
| 3,724,349 | 4/1972 | von Belvard et al. | 354/227.1 X |
| 4,848,890 | 7/1989 | Horn | 351/44 |
| 4,968,127 | 11/1990 | Russell et al. | 351/44 |
| 4,978,208 | 12/1990 | Hsu et al. | 351/45 |
| 5,030,985 | 7/1991 | Bryant | 354/432 |
| 5,051,770 | 9/1991 | Cornuejols | 354/432 |
| 5,276,539 | 1/1994 | Humphrey | 351/44 X |

Primary Examiner—W. B. Perkey

[57] ABSTRACT

In accordance with the present invention, an apparatus and method are described which in general provide for an extended dynamic range in light sensitivity for an imaging device. This extended dynamic range is achieved primarily through control of the light intensity level in a image on a pixel by pixel basis.

In one aspect, a multi-faceted light controller is used like a variable iris camera, but on a pixel by pixel basis; thereby achieving a wider range of intensity control.

In another aspect, this system is enhanced by adding another controller outside the feedback loop, before an added output image detector.

In yet another aspect, some or most of the elements of the controlling and detecting system may be integrated into a composite monolithic structure.

1 Claim, 2 Drawing Sheets

CAMERA WITH LARGE DYNAMIC RANGE

FIELD OF THE INVENTION

Most imaging devices, such as photographic cameras and television imaging devices use an iris or equivalent mechanism to reduce sensitivity of bright scenes. This reduced sensitivity allows proper imaging of the bright areas of the scene, at the cost of contrast and resolution in dark areas. Likewise, maximum sensitivity gives excellent contrast and resolution in the dark areas, at the cost of over exposure and loss of detail in the bright areas. These problems are related to the bulk nature of their operation. They reduce the intensity of all pixel paths equally. This causes a "moving window" of a fixed dynamic range to be moved up and down according to the average light level, as the f-stop is changed. Attempts have been made to reduce the sensitivity on a pixel by pixel basis in charge coupled device (CCD) cameras by setting a nonlinear intensity response of the CCD array. This is usually done by setting a normal range for low light levels and a compressed range for bright areas. This is the "backlight" mode of modern CCD cameras. The problem with this mode is that it is still limited to the basic dynamic range of the CCD elements. In addition, since very bright light is still falling on some pixels, it can "spill over" to adjacent lesser illuminated pixels and cause "blooming" or "smearing".

The eye, however, is more tolerant of a wide range of intensities in a viewed scene, so an imaging device should be at least as tolerant as the eye of wide intensity variations. This imaging device should work over a wide spectrum and have a short response time to insure that image smearing or blocking does not occur when panning a scene. It should operate independent the angle and polarization of the incident radiation. It should be sensitive to energy in the range of design interest. The device should have a fast recovery time and a high damage threshold.

Conventional imaging devices do not adequately meet these requirements. Light control has been on the basis of an iris or other large area light controlling device. Some scanned array systems use two levels, high intensity and low intensity storage/readout methods that are then combined for an output that can be controlled as if an iris existed. The result is a narrow intensity dynamic range within the viewed area.

Conventional intensity control systems can place absorbing components at the focal plane, and therefore are subject to damage by the now concentrated energy density. In the present scheme, the light control receives the field of view over a larger area, making it less subject to burnout. Furthermore, chromatic distortion and birefringence effects of a Liquid Crystal Light Valve (LCLV), ferroelectric light valve (FELV), or other light controller are minimized.

Thus, there is a need in the art for a broad spectrum, short response time, angle and polarization independent, wide intensity dynamic range imaging device. The following describes improvements to such imaging devices.

SUMMARY OF THE INVENTION

The need in the art is addressed by the wide dynamic pictorial sensitivity device of the present described method. This method comprises a liquid crystal light valve, ferroelectric light valve, or other array controlled light valve that is broken into elements, thereby providing a controlled attenuation image of a scene on an elemental basis. More specifically, the techniques used extend the range of intensity for imaging devices presently in existence. This is done by using a wide dynamic range pixel-by-pixel controlled light modulator, which is used as an imaging attenuator, which selectively controls the light reaching the receiving device for each separate pixel ray path. In this method, the series arrangement of light valve and sensor make the result multiplicative. The light valve images the field of view under observation in a spectral range which matches the design range of interest. With proper control, it will automatically attenuate intense areas of the image field while allowing dim areas to pass unattenuated. It is important to note that the total dynamic range has not been lost by use of this method. The control system signal that generated the attenuation pattern can be recorded or transmitted along with the image signal. This recorded or transmitted signal can be used to recreate the original image field dynamic range. Thus, this device and method provides a broad spectrum, short response time, angle and polarization independent, wide dynamic sensitivity device. Hence, the invention is expected to be of significant utility to imaging normal daylight scenes, military imaging, and space remote sensing.

The elemental array of the multi-element light valve (MELV) may be more refined, as refined, or less refined than the controlling or receiving cameras. The last case, in its simplest singular form, is a single-element MELV, therefore acting as an iris, which is recognized as present art.

Figure 1:
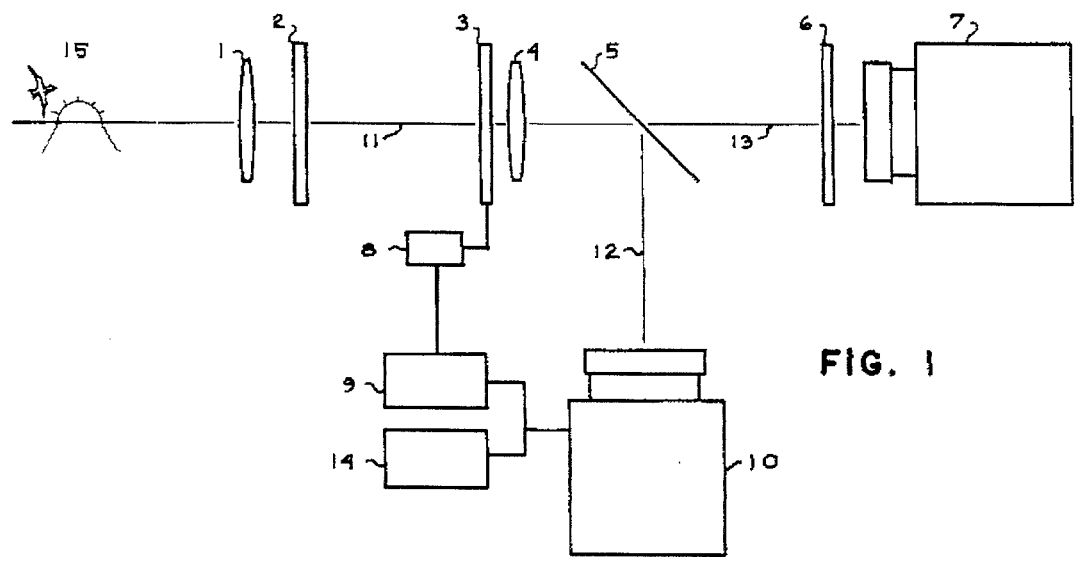
FIG. 1 is a block diagram of the preferred embodiment illustrating the use of one camera as a controller for a multi-element array light valve in order to control light in a pixel to pixel manner to the first controlling camera and to the second receiving camera.
Figure 2:
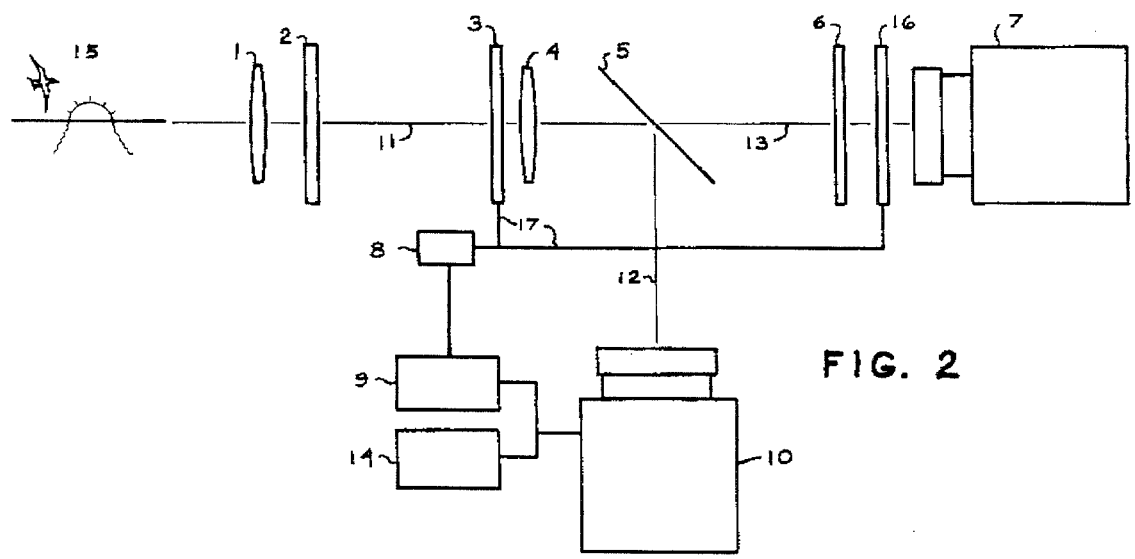
FIG. 2 is a first alternative embodiment block diagram illustrating the use of one camera both as a controller for a multi-element array light valve in order to control light in a pixel to pixel manner to the first controlling camera and to a second multi-element array light valve controlling the second receiving camera.
Figure 3:
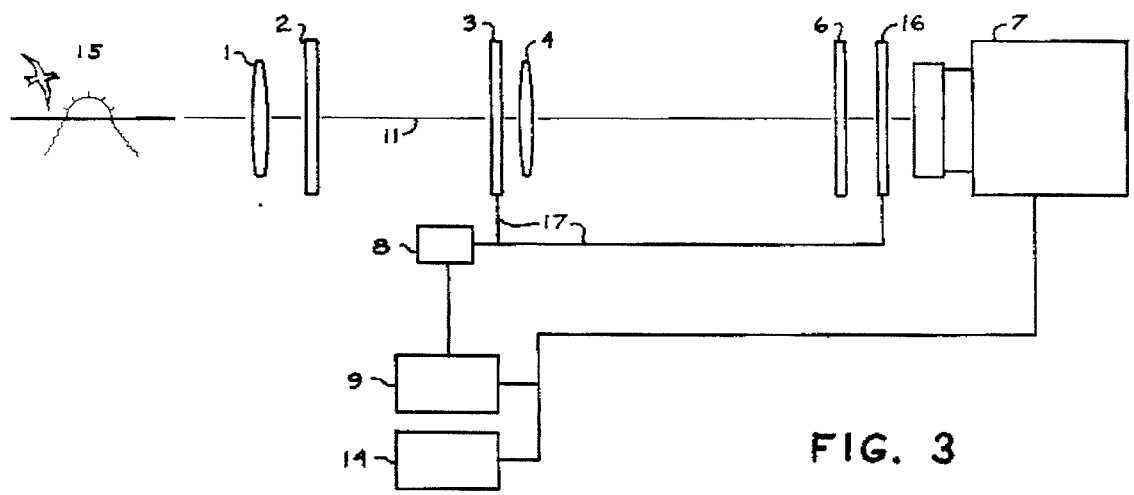
FIG. 3 is a second alternative embodiment block diagram illustrating the use of one camera both as a controller for a multi-element array light valve controlling light in a pixel to pixel manner, and as the receiving camera.

FIG. 1 through FIG. 3 depict the use of a MELV that rotates the polarization of light, and therefore require polarizers for proper functioning as light valves. One such prior art device is a liquid crystal light valve (LCLV). Other forms of MELV's, or other light attenuating methods may not require the use of polarizers; it is understood that these variations are well known to those skilled in the art, and therefore do not affect the utility or coverage of this patent.

Figure 4:
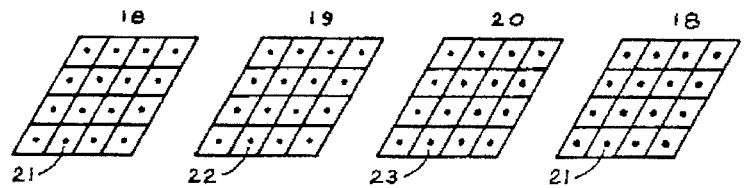

FIG. 4 is an exploded diagram of an integrated and layered controller that comprises the multi-element light intensity controller part(s), as well as an optional light sensor part. This integrated controller can be used as a building block for assembling versions of the previous embodiments.

Figure 5:
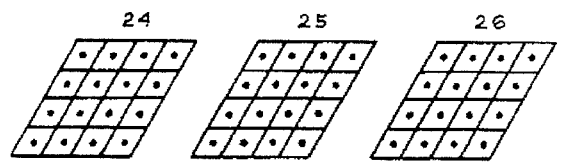

FIG. 5 shows an integrated and layered system usable for protective glasses that both protect, as well as allow full vision at the same time.

Figure 6:
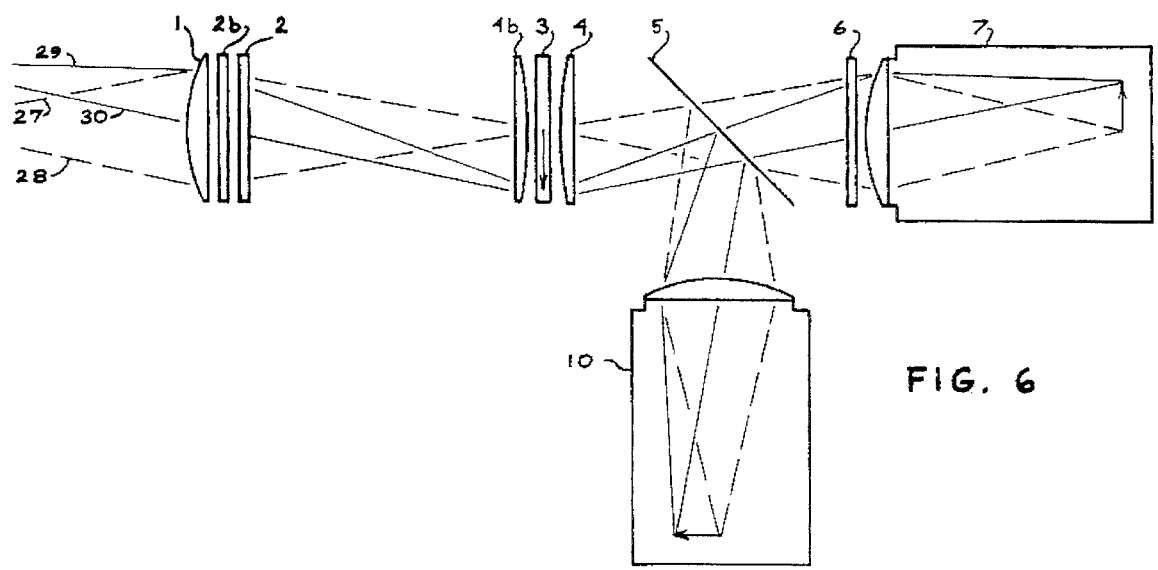

FIG. 6 illustrates various light paths to show how a scene is distributed across the light valve.

DETAILED DESCRIPTION OF THE INVENTION

Illustrative embodiments and exemplary applications will now be described with reference to the accompanying drawings to disclose the advantageous teachings of the present invention.

FIG. 1 is a block diagram where varied intensity image 15 is focused by main lens 1 through polarizer 2 to LCLV or other segmented light valve 3, through relay lenses 4 to beam splitter 5. Relay lenses 4 transfer the focal point of the main lens 1 to the aperture of the cameras 7 and 10. They also make sure that the light rays are parallel through light controller 3 (to reduce chromatic distortion and birefringence effects), as well as guarantee that the light impinging onto the controller is spread over a large area, in order to reduce burnout from high intensity sources. The light path 11 is broken up to two paths of smaller percentage in path 12 and larger percentage in path 13. The light in path 13 goes through analyzing polarizer 6 to receiving camera 7, and the light in path 12 to controller camera 10 which scans the scene via scanner control 9. Scanner control 9 signal goes to the LCLV display driver 8 which scans and modulates LCLV 3. Scanner control 9 may optionally go to a brightness information recorder or transmitter 14.

FIG. 2 is a block diagram where varied intensity image 15 is focused by main lens 1 through polarizer 2 to LCLV or other segmented light valve 3, through relay lenses 4 to beam splitter 5. The light path 11 is broken up to two paths of smaller percentage in path 12 and larger percentage in path 13. Those skilled in the art recognize that the light ratios will affect the overall pictorial result. The light in path 13 goes through analyzing polarizer 6 through a second LCLV 16 to receiving camera 7, and the light in path 12 to controller camera 10 which scans the scene via scanner control 9. Scanner control 9 signal goes to the LCLV display driver 8 which scans and modulates both LCLV 3 and LCLV 16 via control lines 17. Scanner 9 may optionally go to a brightness information recorder or transmitter 14.

FIG. 3 is a block diagram where varied intensity image 15 is focused by main lens 1 through polarizer 2 to LCLV or other segmented light valve 3. Image 15 follows light path 11 through relay lenses 4 through analyzing polarizer 6 to controlling and receiving camera 7, which scans the scene via scanner control 9. Scanner control 9 signal goes to the LCLV display driver 8 which scans and modulates both LCLV 3 and LCLV 16 via control lines 17. Scanner control signal 9 may optionally go to a brightness information recorder or transmitter 14.

FIG. 4 is an exploded diagram of an integrated and layered controller that comprises of a an optional light defocusing and/or steering array 18 consisting of a planar array of lenses 21 to relay light onto a planar, multi-element light intensity controller array 19. Each lens 21 spreads the light onto a single segment 22 of the controller array 19. Note that the defocusing or steering lens array may be used on both sides of the integrated controller, as shown in this diagram with second array type 18. Light passes through controller array 19 onto an optional light sensor array 20 consisting of individual sensor elements 23. These elements may be larger, the same size, or smaller than the elements in the controller 19. These four sections are assembled into a layered structure in the order shown. The elements from layer to layer line up on a pixel to pixel basis. From left to right the order is 18,19,20,18. This planar combination may be fabricated into an integrated, composite controller unit, and may be used as a building block for assembling versions of the previous embodiments.

FIG. 5 shows an integrated and layered system used for protective glasses. For maximum compactness, fresnel lenses may be used. Element 24 represents an integrated combination of main lens 1 and optional polarizer 2 (refer to FIG. 1). Element 25 represents an integrated combination as described in FIG. 4: a de-focusing array, a controller array, a detector array, and finally, another de-focusing array. Element 25 represents a final focusing array and detector array, which acts as the sensing camera 10 as shown in FIGS. 1 through 3. It is understood that one skilled in the art may build other combinations of separate lenses and integrated arrays, which can be used to achieve similar results with alternate advantages in mind.

FIG. 6 illustrates light paths from two parts of a scene, to show how light is distributed over the light valve, and to show that the light rays are relatively parallel when impinging onto the light valve. The mostly perpendicular light paths through the light valve reduces any birefringence or chromatic distortion artifacts of some usable materials for the light valve. The spreading of the image over the area of the controller increases the effective resistance to high energy beams or light impulses. On-axis rays 27 and 28 are shown with off-axis rays 29 and 30 going through focusing lens 1, and then through relay lens 4 to the controlling light valve 3. All other elements have been removed for diagrammatic simplicity.

The present method and devices relate to wide intensity dynamic range imaging devices. More specifically, the present invention relates to techniques that extend the range of allowable intensity for imaging devices in present usage.

While the present invention is described herein with reference to illustrative embodiments for particular applications, it should be understood that the invention is not limited thereto. Those having ordinary skill in the art and access to the teachings provided therein will recognize additional modifications, applications, and embodiments within the scope thereof and additional fields in which the present invention would be of significant utility. For example, the invention is not limited to the optical arrangements illustrated herein.

It is therefore intended by the appended claims to cover any and all such applications, modifications and embodiments within the scope of the present invention.

What is claimed is:

1. A camera arrangement with the following elements and relationships: an objective lens for gathering initial scene light, a following depolarizing retarder, a following polarizer, at the objective lens focal plane a planar array of light polarization rotation elements, a front field lens in front of and adjacent to the planar array to make the light incident to the planar array parallel, a rear field lens following and adjacent to the planar array, the rear field lens and a relay lens imaging the planar array on two receiving planes via a beam splitter behind the relay lens, a second polarizer acting as an analyzer adjacent or within the relay lens, one of said receiving planes presented as an image source for film or direct visual use, at the second of said receiving planes an image sensor that produces an electrical image-representing signal, the image sensor has correspondingly mapped elements to the planar array, the image-representing signal is brought to a connector for optional video output, a means for controlling the intensity of the image representing signal, the image-representing signal is sent to the planar array controlling the correspondingly mapped light polarization rotation elements, the polarization rotation elements controlling the transmitted scene light that falls on the correspondingly mapped array elements of the image sensor.

\* \* \* \* \*